United States Patent
Sarai et al.

(10) Patent No.: US 9,429,108 B2
(45) Date of Patent: Aug. 30, 2016

(54) FILTER DEVICE AND PRESSURE REGULATOR

(71) Applicants: Naohito Sarai, Nagoya (JP); Hiromitsu Kimpara, Toyota (JP)

(72) Inventors: Naohito Sarai, Nagoya (JP); Hiromitsu Kimpara, Toyota (JP)

(73) Assignees: Aisan Kogyo Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/321,431

(22) Filed: Jul. 1, 2014

(65) Prior Publication Data

US 2015/0007540 A1 Jan. 8, 2015

(30) Foreign Application Priority Data

Jul. 4, 2013 (JP) ................. 2013-140798

(51) Int. Cl.
*B01D 46/00* (2006.01)
*F02M 21/02* (2006.01)

(52) U.S. Cl.
CPC ...... *F02M 21/0227* (2013.01); *B01D 46/0031* (2013.01); *B01D 46/0087* (2013.01); *F02M 21/0215* (2013.01); *F02M 21/0239* (2013.01); *Y02T 10/32* (2013.01)

(58) Field of Classification Search
CPC .... B01D 46/31; B01D 46/87; F02M 21/215; F02M 21/227; F02M 21/239
USPC ............................ 55/505; 422/112, 211, 220
See application file for complete search history.

(56) References Cited

U.S. PATENT DOCUMENTS

| | | | |
|---|---|---|---|
| H773 H | 5/1990 | Keedwell et al. | |
| 2010/0172805 A1* | 7/2010 | Kamitani | 422/112 |

FOREIGN PATENT DOCUMENTS

| | | |
|---|---|---|
| CN | 200975296 (Y) | 11/2007 |
| DE | 3513513 A1 | 10/1986 |
| EP | 2 829 704 A1 | 1/2015 |
| JP | 2005503892 | 7/2005 |
| JP | 2007130560 | 5/2007 |
| JP | 2010167417 | 8/2010 |

OTHER PUBLICATIONS

German Office Action for Application No. 10 2014 109 259.7, filed May 19, 2016 (4 pgs) and English Language Machine Translation (4 pgs).

* cited by examiner

*Primary Examiner* — Robert Clemente
*Assistant Examiner* — Karla Hawkins
(74) *Attorney, Agent, or Firm* — Patterson Thuente Pedersen, P.A.

(57) ABSTRACT

A filter device includes a cylindrical filter, a lid member, and an urging member. The filter catches foreign matter contained in gaseous fuel. The filter has a first opening located in one end and a second opening located in the other end of the filter opposite to the first opening. The filter is arranged in the drain tank with the first opening closed with a wall member such that gaseous fuel is allowed to be drawn into the filter through the inflow portion. The gaseous fuel that has passed through the filter flows out of the drain tank through the outflow portion. The lid member closes the second opening of the filter. The urging member urges the lid member toward the filter.

7 Claims, 2 Drawing Sheets

FILTER DEVICE AND PRESSURE REGULATOR

RELATED APPLICATION

This application claims benefit of priority from Japanese Patent Application No. 2013-140798, filed Jul. 4, 2013, said application being hereby fully incorporated herein by reference.

BACKGROUND OF THE INVENTION

The present invention relates to a filter device, which removes foreign matter contained in gaseous fuel supplied to an internal combustion engine, and a pressure regulator, which includes the filter device.

A pressure regulator as disclosed in Japanese Laid-Open Patent Publication No. 2010-167417 is provided in a supply passage through which gaseous fuel such as compressed natural gas (CNG) is supplied to an internal combustion engine. Such a pressure regulator includes a reducing valve, which reduces the pressure of the gaseous fuel, and a filter device, which removes foreign matter such as oil contained in the gaseous fuel.

The filter device includes a substantially cylindrical drain tank with a closed end. The body of the pressure regulator closes the opening of the drain tank. A cylindrical filter and a lid member arranged on the bottom of the filter are provided in the drain tank. The lid member includes a post, which extends downward. The lid member is supported by the bottom wall of the drain tank with the post. The lid member closes the bottom opening of the filter, and the body closes the top opening of the filter.

The gaseous fuel with the pressure reduced by the reducing valve flows through an inflow portion into the drain tank, passes through the filter, and then flows out of the drain tank through an outflow portion. The foreign matter caught by the filter when the gaseous fuel passes through the filter as described above is accumulated in the drain tank.

The pressure regulator is provided in an engine compartment. The body of the pressure regulator may receive thermal energy emitted from a thermal source such as an internal combustion engine provided in the engine compartment so that the body may be heated to a high temperature. When the body is heated to a high temperature as described above, the filter that is in contact with the body becomes high temperature as well. Accordingly, the filter may be deformed.

If the filter is shortened by such a deformation in the axial direction, a gap may occur in at least one of the interface between the filter and the body and the interface between the filter and the lid member. In this case, a part of the gaseous fuel that has flowed through the inflow portion into the drain tank may flow into the gap. The gaseous fuel that has flowed into the gap as described above flows out of the drain tank through the outflow portion without passing through the filter. Accordingly, if a gap occurs in at least one of the interface between the filter and the body and the interface between the filter and the lid member due to the deformation of the filter, the performance of the filter device for catching the foreign matter will be reduced.

SUMMARY OF THE INVENTION

An objective of embodiments of the present invention is to address the drawbacks of prior art devices by providing a filter device and a pressure regulator that limit the reduction of the performance of a filter for catching foreign matter contained in gaseous fuel.

According to a first aspect of embodiments of the present invention, a filter device including a cylindrical filter, a lid member, and an urging member is provided. The cylindrical filter catches foreign matter contained in gaseous fuel. The filter has a first opening at an end thereof and a second opening at another end opposite to the first opening. The filter is arranged in a drain tank with the first opening closed with a wall member such that the gaseous fuel is allowed to be drawn into the filter through an inflow portion. The gaseous fuel that has passed through the filter flows out of the drain tank through an outflow portion. The lid member closes the second opening of the filter. The urging member urges the lid member toward the filter.

According to a second aspect of embodiments of the present invention, a pressure regulator including a reducing valve and the filter device according to above first aspect is provided. The reducing valve reduces a pressure of gaseous fuel. The filter device is formed integrally with the reducing valve. Gaseous fuel the pressure of which has been reduced by the reducing valve flows into the drain tank of the filter device through the inflow portion.

Other aspects and advantages of embodiments of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
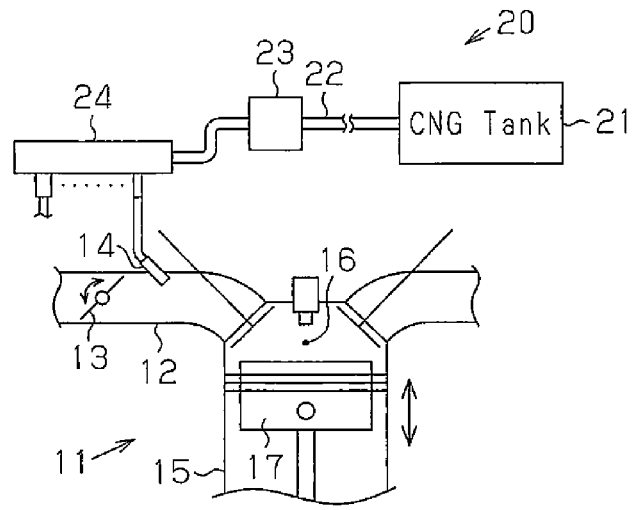
FIG. 1 is a schematic diagram illustrating a supply system, which includes a pressure regulator according to one embodiment, and an internal combustion engine operated when CNG is supplied from the supply system.
Figure 2:
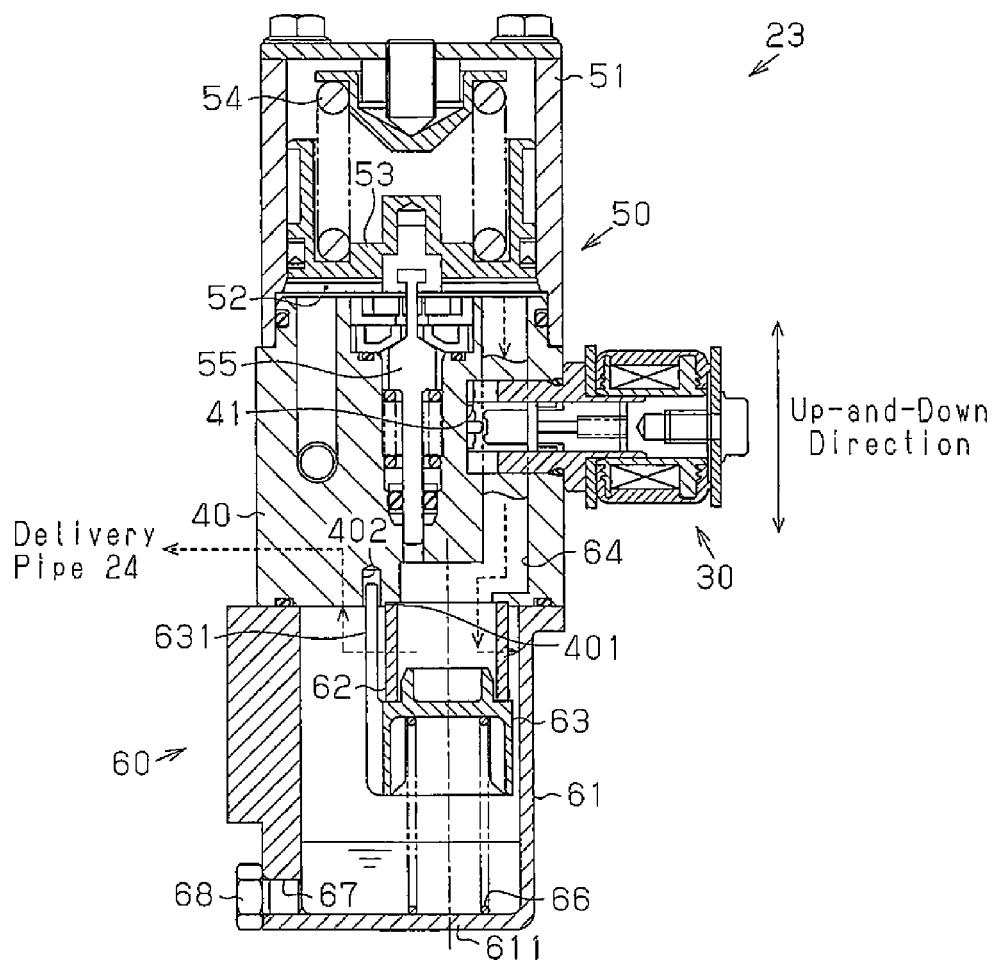
FIG. 2 is a cross sectional view schematically illustrating the pressure regulator according to the present embodiment.
Figure 3:
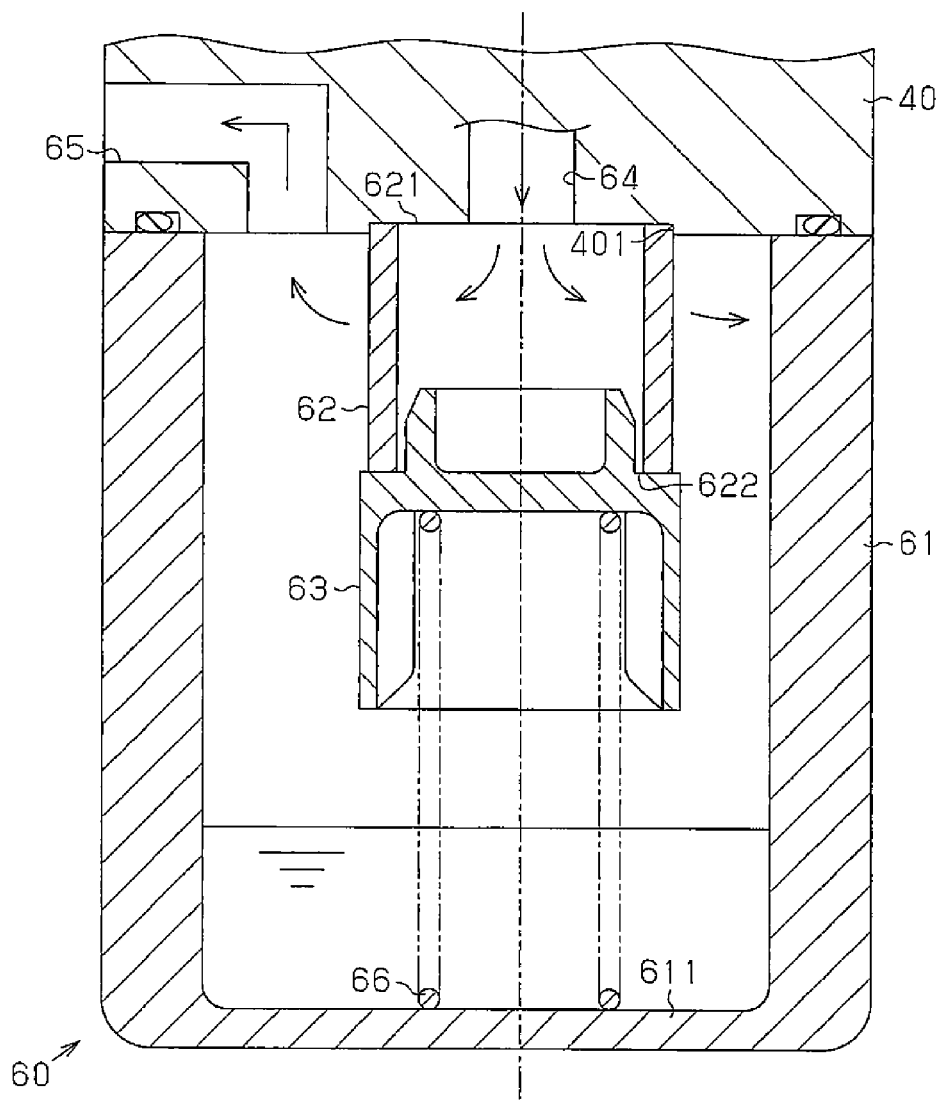
FIG. 3 is an enlarged cross sectional view schematically illustrating a filter device of the pressure regulator according to the present embodiment.

Hereafter, a filter device and a pressure regulator according to one embodiment will be disclosed with reference to FIGS. 1 to 3.

FIG. 1 shows a supply system 20 and an internal combustion engine 11. The supply system 20 supplies the internal combustion engine 11 with compressed natural gas (CNG) as an example of gaseous fuel. The internal combustion engine 11 is operated when the CNG is supplied to the internal combustion engine 11. As shown in FIG. 1, the internal combustion engine 11 includes an intake passage 12. The intake passage 12 includes a throttle valve 13, by which an opening is adjusted in accordance with the accelerator operation by the driver, and an injector 14, which injects the CNG supplied from the supply system 20. The gaseous mixture formed by the intake air that has passed through the throttle valve 13 and the CNG that has been injected through the injector 14 burns in a combustion chamber 16 in a cylinder 15. Accordingly, a piston 17 reciprocates so that the crankshaft, which serves as an output shaft of the internal combustion engine 11, rotates in a predetermined rotation direction.

The supply system 20 includes a high-pressure fuel line 22 connected to a CNG tank 21, which stores the CNG. The pressure of the CNG, which flows in the high-pressure fuel line 22, is reduced to a predetermined fuel pressure by the pressure regulator 23 according to the present embodiment, and the CNG after the reduction of the pressure is supplied to a delivery pipe 24. The CNG supplied through the delivery pipe 24 is injected through the injector 14 into the intake passage 12.

Next, with reference to FIG. 2, the pressure regulator 23 according to the present embodiment will be described. Here, the description will be given assuming that the up-and-down direction in FIG. 2 corresponds to the vertical direction.

As shown in FIG. 2, the pressure regulator 23 includes an electromagnetic shut-off valve 30, a reducing valve 50, and a filter device 60. The shut-off valve 30 opens when the CNG is supplied to the internal combustion engine 11. The shut-off valve 30 closes when the CNG is not supplied to the internal combustion engine 11. If the shut-off valve 30 opens, as for the CNG that has flowed from the CNG tank 21 into the body 40 of the pressure regulator 23, the pressure of the CNG is reduced to a predetermined pressure by the reducing valve 50 after the CNG has passed through the shut-off valve 30. The CNG then flows into the filter device 60. In the filter device 60, foreign matter such as oil contained in the CNG is removed, and then the CNG is drawn into the delivery pipe 24.

The reducing valve 50 includes a substantially cylindrical reducing valve housing 51 with a closed end. The reducing valve housing 51 is attached to the body 40 such that the upper surface of the body 40, which is substantially cuboid, closes the opening of the reducing valve housing 51, which is located at the lower end of the reducing valve housing 51. The reducing valve 50 includes a pressure control chamber 52 in the reducing valve housing 51. The pressure control chamber 52 includes a piston 53 and a reducing valve spring 54, which urges the piston 53 downward, that is, toward the upper surface of the body 40. The body 40 includes a pressure control valve 55, which moves up and down to control the pressure of the CNG.

The side face of the body 40 includes a mounting recess 41 (right in FIG. 2). The shut-off valve 30 is attached to the body 40 such that the tip end of the shut-off valve 30 is inserted into the mounting recess 41.

Next, the filter device 60 according to the present embodiment will be described with reference to FIGS. 2 and 3.

As shown in FIG. 2, the filter device 60 is provided below the body 40. The filter device 60 includes a substantially cylindrical drain tank 61 with a closed end. The drain tank 61 is attached to the body 40 such that the lower surface of the body 40 closes the opening of the drain tank 61. A communicating hole 67 is formed in the lower end of the side wall of the drain tank 61. The communicating hole 67 connects the outside and the inside of the drain tank 61. The communicating hole 67 is closed by a manual valve 68. When the valve 68 is removed from the drain tank 61, the foreign matter such as oil that has been accumulated in the drain tank 61 is drained to the outside through the communicating hole 67.

As shown in FIGS. 2 and 3, the filter device 60 includes, in the drain tank 61, a cylindrical filter 62, a lid member 63 arranged further away from the body 40 than the filter 62, and a spring 66 as an example of an urging member arranged further away from the filter 62 than the lid member 63.

The lower surface of the body 40 has a recess 401. An inflow portion 64, which allows the CNG to flow into the drain tank 61, opens to the bottom surface of the recess 401. The filter 62 is arranged such that the axial direction of the filter 62 corresponds to the up-and-down direction. The upper end of the filter 62 is located in the recess 401. That is, the body 40, more specifically, the bottom surface of the recess 401 closes the top opening 621, which serves as a first opening of the filter 62, to allow the gaseous fuel to be drawn through the inflow portion 64 into the filter 62. Accordingly, the body 40 corresponds to "a wall member", which closes the top opening (the first opening) 621 of the filter 62.

Also, the lid member 63 closes the bottom opening 622, which serves as a second opening of the filter 62. The lid member 63 includes a guide rod 631, which extends toward the body 40 located above the lid member 63. The guide rod 631 is located outside of the filter 62. The tip end of the guide rod 631 enters a guide recess 402 formed in the body 40.

The spring 66 is configured by a material such as stainless steel that does not easily corrode. The spring 66 is supported by the bottom wall 611 of the drain tank 61 and urges the lid member 63 upward, that is, in the direction in which the lid member 63 approaches the body 40. That is, the lid member 63 closes the bottom opening 622 of the filter 62 in the state where the lid member 63 receives the urging force from the spring 66.

The urging force of the spring 66 is greater than the pressure of the CNG that flows through the inflow portion 64 into the filter 62 in the drain tank 61. More specifically, the urging force of the spring 66 is greater than the maximum value (maximum pressure) of the pressure that can occur inside the filter 62.

Further, in the filter device 60 according to the present embodiment, the inflow portion 64 is located inside the filter 62. In contrast, an outflow portion 65 is located outside the filter 62. The outflow portion 65 allows the CNG in the drain tank 61 to flow out of the drain tank 61. In details, the inflow portion 64 is located radially inward of the filter 62, and the outflow portion 65 is located radially outward of the filter 62. Accordingly, the CNG flows through the inflow portion 64 into the filter 62 in the drain tank 61. The CNG that has passed through the filter 62 from the inside to the outside of the filter 62 flows out of the drain tank 61 through the outflow portion 65. The foreign matter such as oil caught by the filter 62 when the CNG passes through the filter 62 as described above is accumulated in the drain tank 61.

Next, an operation of the pressure regulator 23 according to an embodiment will be described. The pressure regulator 23 is provided in the engine compartment, and may receive thermal energy emitted from the internal combustion engine 11 so that the body 40 may be heated to a high temperature. If the body 40 is heated to a high temperature as described above, the thermal energy is transmitted from the body 40 to the filter 62, which is in contact with the body 40.

If the thermal energy is transmitted from the body 40 to the filter 62, the upper end of the filter 62 may be heated to a high temperature so that the filter 62 may be deformed to be shortened in the axial direction (the up-and-down direction in FIG. 2). In the filter device 60 according to the present embodiment, the lid member 63 is urged toward the body 40 by the spring 66. Accordingly, even if the filter 62 is shortened in the axial direction, the lid member 63, which receives the urging force from the spring 66, is displaced in the direction in which the lid member 63 approaches the body 40 by a distance equivalent to the shortened length of the filter 62. Therefore, even if the filter 62 is shortened in the axial direction, the gap does not occur in the interface between the filter 62 and the lower surface of the body 40 or in the interface between the filter 62 and the lid member 63. As a result, the CNG is unlikely to flow out of the drain tank 61 through the outflow portion 65 without passing through the filter 62.

The above configuration and the operation may have the following advantages.

(1) The body 40 closes the top opening 621 of the filter 62 such that the gaseous fuel is allowed to be drawn through the inflow portion 64 into the filter 62. Also, the lid member 63 closes the bottom opening 622 of the filter 62. Further, the lid member 63 is pressed against the filter 62 by the urging force, which is applied to the lid member 63 by the spring 66, so that the filter 62 is pressed against the body 40.

Accordingly, even if the filter 62 is shortened in the axial direction, the lid member 63 is displaced in the direction in which the urging force from the spring 66 urges the lid member 63 such that the lid member 63 approaches the body 40. Therefore, the gap is unlikely to occur in the interface between the filter 62 and the body 40 and in the interface between the filter 62 and the lid member 63. As a result, the CNG that has flowed through the inflow portion 64 into the drain tank 61 is unlikely to flow out of the drain tank 61 through the outflow portion 65 without passing through the filter 62. Therefore, the reduction of the performance of the filter 62 for catching the foreign matter contained in the CNG is limited.

(2) The urging force of the spring 66 is greater than the maximum value (maximum pressure) of the pressure that can occur inside the filter 62. The pressure of the gaseous fuel that flows through the inflow portion 64 into the filter 62 is less than the urging force of the spring 66. Accordingly, when the CNG flows through the inflow portion 64 into the filter 62, the displacement of the lid member 63 in the direction away from the body 40 against the urging force of the spring 66 is limited. That is, the occurrence of the gap in the interface between the filter 62 and the body 40 and in the interface between the filter 62 and the lid member 63 is limited. Therefore, any reduction of the performance of the filter 62 for catching the foreign matter contained in the CNG is limited.

(3) The spring 66 is arranged at a position further away from the body 40 than the filter 62, that is, downward from the filter 62. That is, the spring 66 is arranged at a position out of the flow path of the CNG in the drain tank 61. The spring 66 does not inhibit the flow of the CNG in the drain tank 61. Therefore, the increase of the pressure loss of the CNG that flows inside the drain tank 61 is limited.

The above embodiment may be modified to other embodiments below.

The urging member may be any urging member other than the spring 66 as long as the urging member exerts urging force to the lid member 63 such that the lid member 63 approaches the body 40. For example, the urging member may be a tension spring. In this case, the tension spring is located between the body 40 and the lid member 63. This may more or less increase the pressure loss of the CNG that flows in the drain tank 61. However, the same advantages obtained in the above (1) and (2) are obtained.

The filter 62 may be arranged such that, in the drain tank 61, the inflow portion 64 is located outside the filter 62 and the outflow portion 65 is located inside the filter 62. In this case, the CNG that has flowed through the inflow portion 64 into the drain tank 61 passes through the filter 62 from the outside to the inside of the filter 62, and then flows out of the drain tank 61 through the outflow portion 65. Even in such a configuration, the CNG passes through the filter 62 in the drain tank 61 so that foreign matter such as oil contained in the CNG is caught by the filter 62.

The pressure regulator 23 may be configured such that the filter device 60 is located upstream from the reducing valve 50. In this case, the CNG flows into the drain tank 61 of the filter device 60 before the pressure of the CNG is reduced. The pressure of the CNG that has passed through the filter 62 is reduced by the reducing valve 50.

Therefore, the present examples and embodiments are to be considered as illustrative and not restrictive and the invention is not to be limited to the details given herein, but may be modified within the scope and equivalence of the appended claims.

The invention claimed is:

1. A filter device and trap in a pressure regulator for gaseous fuel, the filter device and trap comprising:
   a cylindrical filter, which catches foreign matter including liquid contained in the gaseous fuel, wherein the filter has a first opening at an end thereof and a second opening at another end opposite to the first opening, wherein the filter is arranged in a drain tank of the trap with the first opening closed with a wall member such that the gaseous fuel is allowed to be drawn into the filter through an inflow portion, and wherein the gaseous fuel that has passed through the filter flows out of the drain tank through an outflow portion, the liquid being contained in the drain tank;
   a lid member, which closes the second opening of the filter; and
   an urging member, which urges the lid member toward the filter, wherein the urging force of the urging, member is greater than a force applied to the lid member based on a maximum pressure that can occur inside the filter.

2. The filter device and trap according to claim 1, wherein the filter is arranged in the drain tank such that the inflow portion is located inside the filter and the outflow portion is located outside the filter.

3. The filter device and trap according to claim 1, wherein the urging member is located on an opposite side of the filter from the wall member.

4. The filter device and trap according to claim 1, wherein the urging member is arranged at as position further away from the wall member than the filter.

5. The filter device and trap according to claim 1, wherein the urging member is arranged at a position out of a flow path of the gaseous fuel in the drain tank.

6. The filter device and trap according to claim 1, wherein the filter device is a part of a pressure regulator, and the pressure regulator comprises a reducing valve, which reduces a pressure of gaseous fuel, wherein the filter device is formed integrally with the reducing valve, and wherein gaseous fuel, the pressure of which has been reduced by the reducing valve, flows into the drain tank of the filter device through the inflow portion.

7. A filter device and trap according to claim 1, wherein the filter device is formed integrally with the reducing valve, wherein gaseous fuel the pressure of which has been reduced by the reducing valve flows into the drain tank of the filter device through the inflow portion.

* * * * *